United States Patent [19]
Arndt et al.

[11] 3,870,488
[45] Mar. 11, 1975

[54] LIQUID ELIMINATOR

[75] Inventors: Frederick W. Arndt; Joseph H. Gavin, both of Bay Village, Ohio

[73] Assignee: Dart Industries Inc., Los Angeles, Calif.

[22] Filed: June 29, 1973

[21] Appl. No.: 374,881

Related U.S. Application Data

[63] Continuation of Ser. No. 72,405, Sept. 15, 1970, abandoned.

[52] U.S. Cl. .............................................. 55/440
[51] Int. Cl. .......................................... B01d 45/08
[58] Field of Search ....................... 55/440, 391–399

[56] References Cited
UNITED STATES PATENTS

| | | | |
|---|---|---|---|
| 2,643,736 | 6/1953 | Smith | 55/440 |
| 3,276,193 | 10/1966 | Lamb | 55/440 |
| 3,338,035 | 8/1967 | Dinkelacker | 55/440 |
| 3,358,580 | 12/1967 | Freese et al. | 55/440 |

FOREIGN PATENTS OR APPLICATIONS

| | | | |
|---|---|---|---|
| 849,348 | 11/1952 | Germany | 55/392 |

OTHER PUBLICATIONS

Vane Mist Eliminator, Bulletin 6, Perry Equipment Corp., Mineral Wells, Texas, pp. 1–4, dated 4/66.

*Primary Examiner*—Bernard Nozick
*Attorney, Agent, or Firm*—Bosworth, Sessions & McCoy

[57] ABSTRACT

A liquid eliminator comprising a plurality of blades for separating entrained liquid from a moving gaseous stream. Each blade has a sinuous, undulating configuration in the direction of the flow of gas with trapping vanes or traps as well as notched and serrated deflectors opening upstream intermediate the sinuous bends of the blades. The blades are mounted in parallel juxtaposition to form like, parallel sinuous paths between the blades for the passage of gas and removal of entrained liquid. The trapping vanes and serrated notches are preferably formed integrally with the blades. The trapping vanes are crescent-shaped and join the blades at their downstream ends and are reentrantly curved with small upstream openings and a smoothly curved convex, bulbous mid-portions tending to form a venturi-like passage with the opposite wall of the adjacent juxtaposed blade. The venturi effect accelerates the moving stream of gas and entrained liquid particles and projects the liquid particles out of the curving gaseous stream and into the next downstream trapping vane or trap. Sharp edged serrated liquid diverting means are also provided to trap or divert fine liquid droplets and mist downstream of the primary traps. An eliminator comprising the presently disclosed blades provides, compared with prior practice, a significantly greater volume throughout of gas with the liquid eliminated and with a significantly lower pressure drop from fluid inlet to gas outlet.

20 Claims, 6 Drawing Figures

INVENTORS
FREDERICK W. ARNDT
JOSEPH H. GAVIN
BY
ATTORNEYS

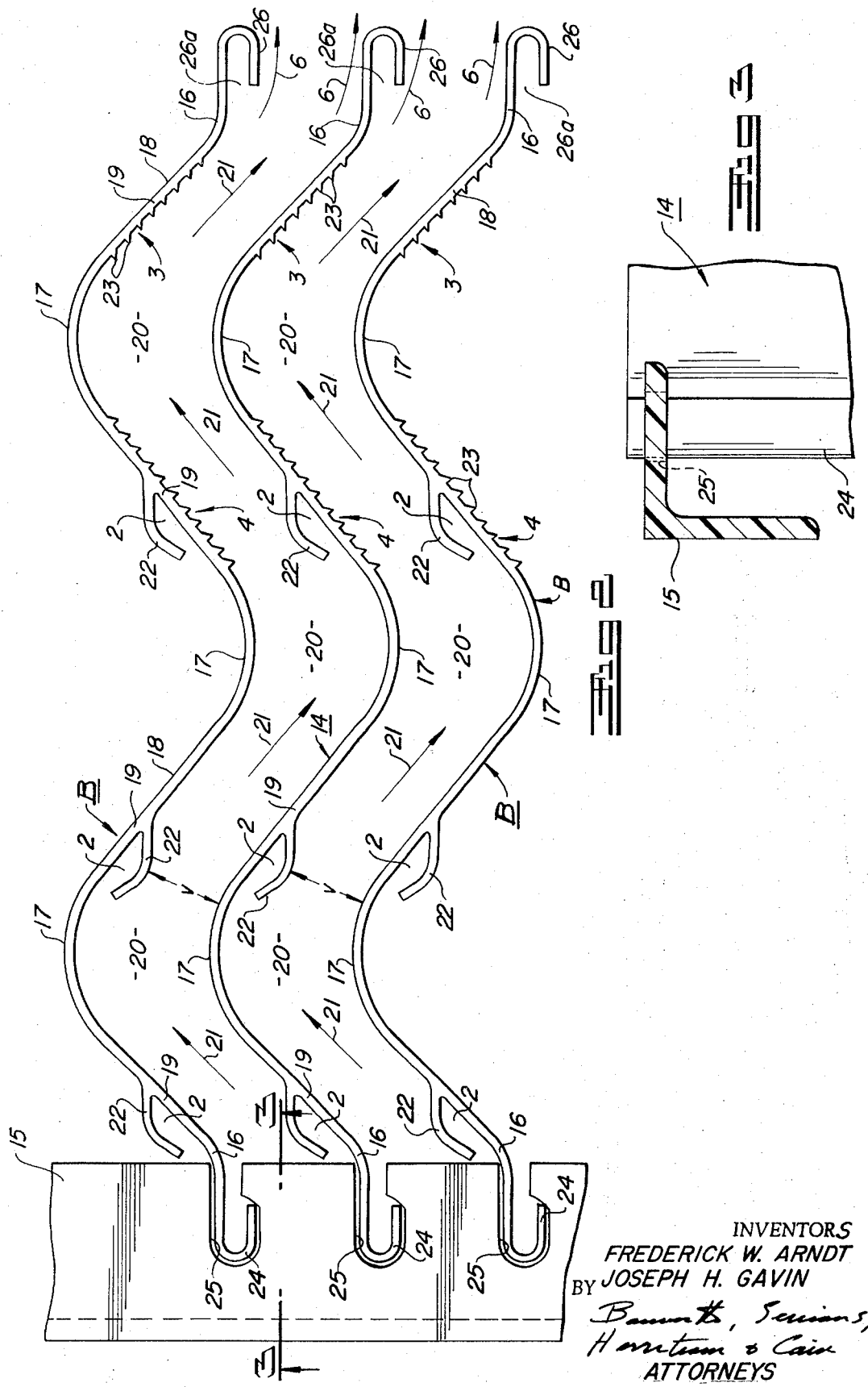

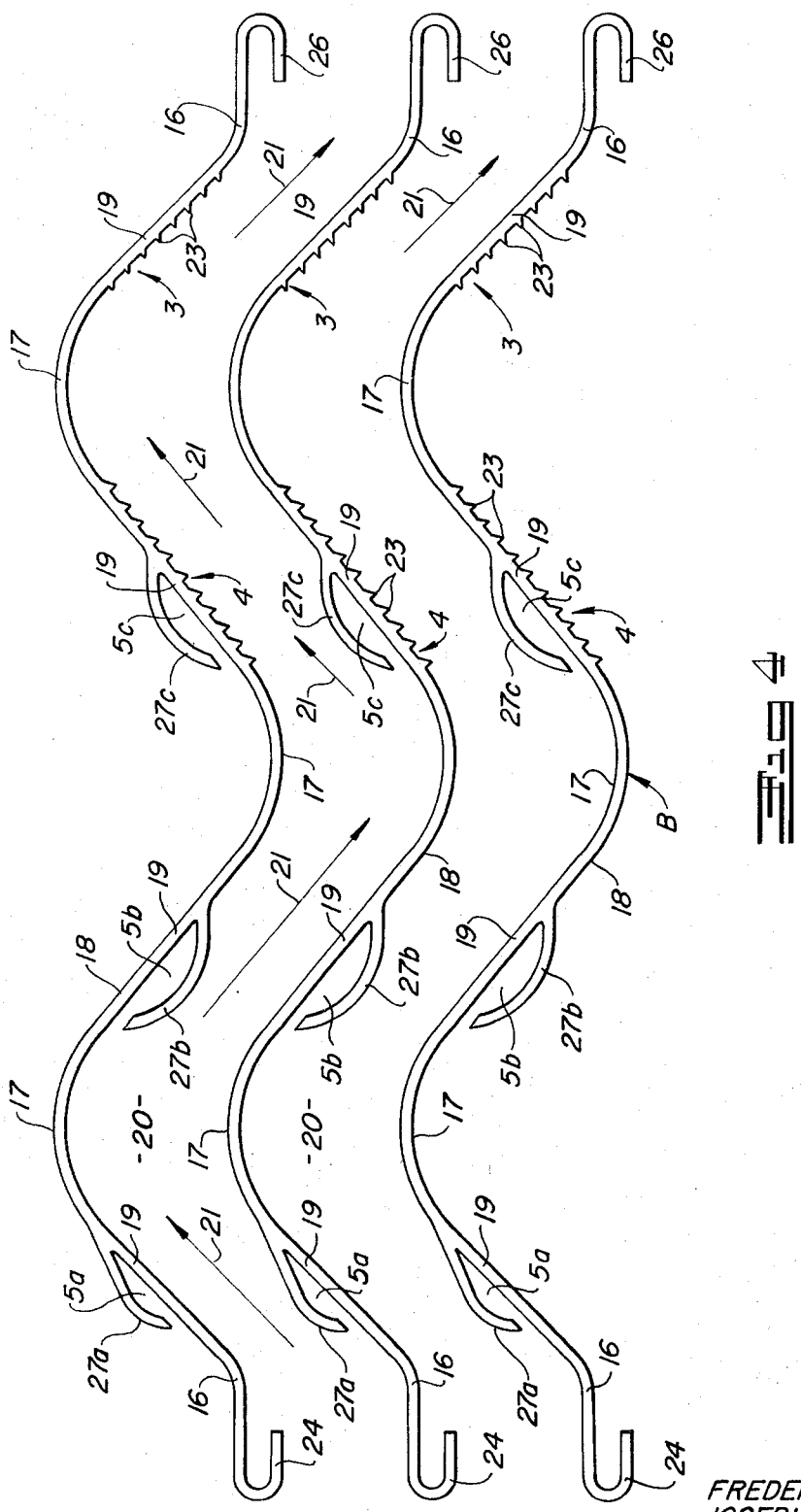

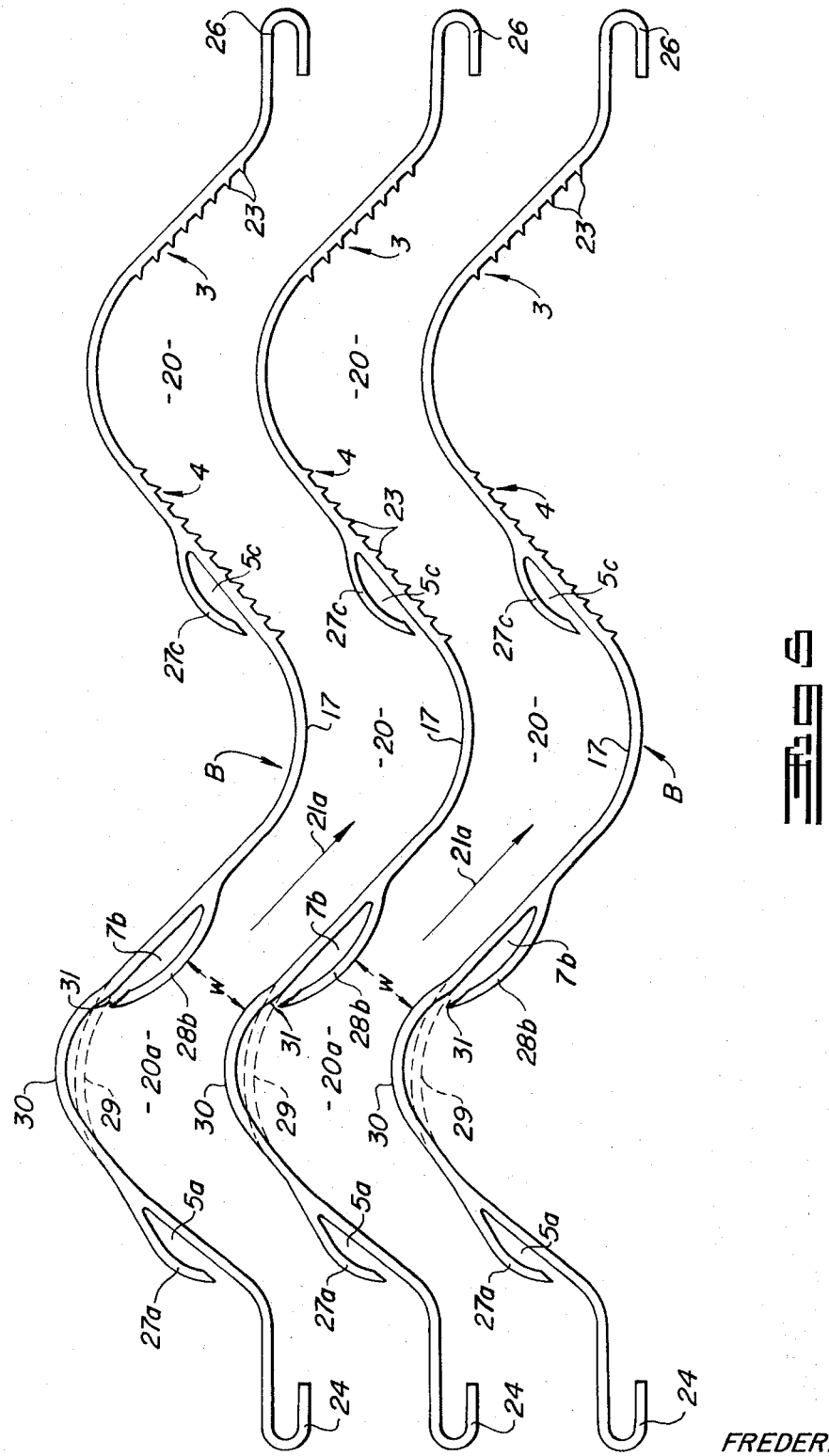

LIQUID ELIMINATOR

This is a continuation of application Ser. No. 72,405, filed Sept. 15, 1970, now abandoned.

BACKGROUND OF THE INVENTION

In many operations, it is necessary to extract a liquid mist and/or liquid particles from a gas in which it is suspended or entrained, either because the gas must be freed of the entrained liquid before the gas can be used, or because the liquid forming the mist is itself useful and comprises a valuable recovery product.

Various devices have been employed for removing entrained liquid from gases. Pertinent and illustrative prior patents include Carrier U.S. Pat. No. 808,897 of 1906; Smith U.S. Pat. No. 1,603,878 of 1926; Smith U.S. Pat. No. 2,643,736; Dinkelacker U.S. Pat. No. 3,338,035 of 1967; and Freese et al. U.S. Pat. No. 3,358,580 of 1967. The prior art devices known to applicants have not provided the triple goal of mist and liquid elimination, high volume throughput and little fluid pressure drop through the eliminator.

SUMMARY OF THE INVENTION

Blades are provided for separating and trapping-out entrained liquid from rapidly moving gas. Each blade has a longitudinally sinuous, undulating configuration in the direction of movement of the gas with one or more major curved bends at each sinuous apex, peak or loop which are smoothly joined by intermediate, substantially straight portions passing through the nodes of the curve. Each blade has a minor curve or half-apex at the beginning and end of its sinuous path. Each blade has a liquid trap or liquid diverting means on its intermediate portion at or adjacent the nodes of the curves of the body downstream of the concave aspect of an apex or half-apex of the curve. In a presently preferred form an additional liquid diverting means in the form of small sharp notches and projections is employed adjacent a node of the curve downstream of the convex aspect of one of the apexes.

Each liquid trap and diverting means extends the full vertical height, sometimes called vertical length, from top end to bottom end, of the blade; i.e., the vertical height of the blades comprising an eliminator as viewed in FIG. 1, so that trapped liquid flows out of the trap by gravity. For convenience and accommodation of usage in the trade, the literal width of the blades; i.e., the right and left dimension as viewed in FIGS. 2, 4, 5 and 6 which is the horizontal length, or length in the direction of sinuous fluid movement through the eliminator, will be called, arbitrarily, the "length" of the blades. The lateral side edges of the blades at their right and left extremities in these figures will be called the "ends," or horizontal ends, of the blades.

A feature of our invention is that the liquid traps present smooth convexly rounded surfaces to the moving fluid stream which are almost continuous, upstream as well as downstream, with the adjacent smooth surface of the blade whereby to diminish, if not eliminate, turbulence in the fluid stream adjacent the traps. A companion feature is that the traps are so located with respect to the surface of the adjacent juxtaposed blade on the opposite side of the fluid stream as to form a venturi-like restriction therewith whereby to give advantageous direction and acceleration to the stream and the liquid particles entrained therein. Each blade is adapted to be supported by a frame in combination with a series of other like coacting blades in transversely spaced relation to form a plurality of sinuous, parallel paths between every pair of blades through which the fluid is moved.

The liquid traps comprise curved vanes which are preferably formed, i.e., extruded, integrally with the blades at the downstream end of the vanes, curve upstreamward and outwardly from the body of the blade and thence upstreamward and inwardly back toward, but short of contact with the blade to leave a small, slit of an upstream inlet opening to the trap. The vanes are long enough and spaced sufficiently from the blade and afford an ample conduit for the free gravity flow of liquid out of the eliminator, and are curved vis-a-vis the oppositely adjacent blade to form a venturi-like throat therewith. A mist and/or liquid eliminator comprising these blades arranged in side-by-side fashion, as more fully disclosed below, affords a significantly greater volume throughput of the gaseous fluid with less pressure drop through the eliminator, and with complete liquid elimination than has been possible with any prior art devices.

BRIEF DESCRIPTION OF THE DRAWINGS

In the accompanying drawings:

FIG. 2 is a top plan view at about full scale of the tops, or top vertical ends, of three of one form of the many vertically disposed blades as they would be seen looking downwardly into the eliminator of FIG. 1 with its top cover removed;

FIG. 3 is a sectional view of the blade-holding bracket of FIG. 2 taken in the plane on the line 3—3 in FIG. 2;

FIG. 4 is another top plan view similar to FIG. 2, showing blades having a modified form and position for the traps and vanes on the blades;

FIG. 5 is another top plan similar to that of FIGS. 2 and 4, showing an illustrative modified offset disposition of certain of the apexes of the curve of the blades in relation to the vanes of the traps;

DESCRIPTION OF THE PREFERRED EMBODIMENTS

Figure 1:
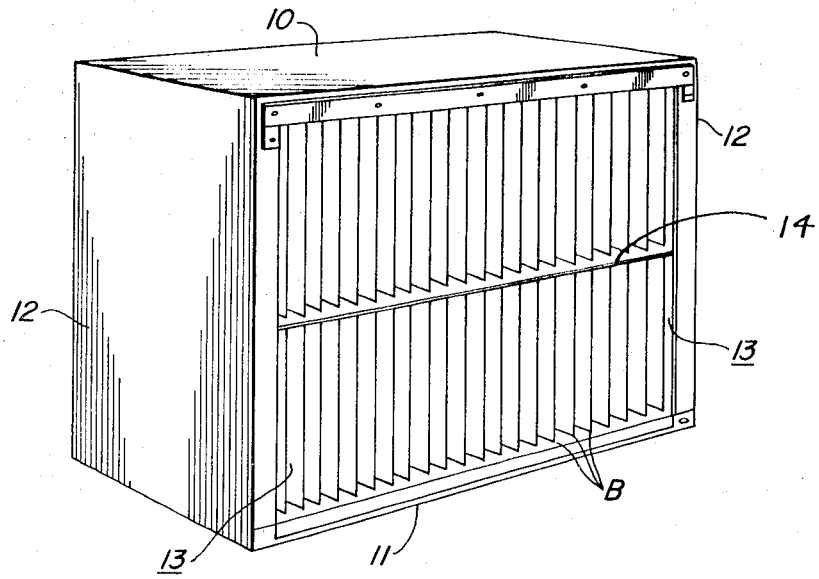
FIG. 1 is an isometric view on a reduced scale of a liquid eliminator comprising an assembly and combination of blades of the present invention.

FIG. 1 illustrates one form of eliminator apparatus in which blades of the present invention may be mounted and used. This comprises an open-end cabinet having a horizontal top 10, a bottom 11, jointed by two vertical sides 12 so as to leave opposed open ends 13 through which a liquid-laden gas may be forcibly passed. A series of blades generally designated, B, standing vertically, fills the cabinet from top to bottom with the horizontal lengths of the blades extending from one open end 13 to the other. Brackets 15 fixed to the cabinet adjacent the top 10 and bottom 11 (FIGS. 2 and 3) removably grip the ends of the blades (the left end only being shown for illustration) to hold them in parallel, spaced relation as shown in FIGS. 2, 4, 5 and 6. A center, notched reinforcing bar 14 extends between and is secured to the sides 12 and has notches in which the midportions of the horizontal ends of the blades B are seated and held steady against the rush of gaseous fluid through the eliminator.

In FIG. 2 blades embodying one form of our invention are shown in relation to each other as they are disposed in the eliminator; three blades being arbitrarily shown for illustration. In this form each blade B is the same as the others and comprises a sheet of material formed, preferably extruded, into a sinuous, undulating configuration in the direction of its length, as viewed, to form substantially right angled bends with curved apexes or loops 17 joined by relatively straight, intermediate sections 18 embracing the nodes 19 of the curve. The blades are juxtaposed to one another in uniform, symmetrical, spaced relation to define sinuous paths 20 therebetween for the forced rapid movement of gaseous fluid in the direction of arrows 21. Trapping vanes 22 formed integrally with the blades at the downstream ends of the vanes near nodes 19, curve upstream and away from the blades and are then curved cresent-like to bring the upstream ends of the vanes back closer to the blades than are the mid portions of the vanes. The traps 2 thus formed are big enough to conduct freely all the liquid trapped therein from the top to the bottom of the eliminator. The curved convex exterior surfaces of the vanes divert the fluid stream, less liquid which flows into the trap, away from the small trap opening or mouth smoothly, and inhibit the production of deleterious eddies and turbulence in the fluid stream adjacent and downstream of the traps. The vanes 22 have a sufficient length and curvature into the paths 20 to narrow the paths as at the throats —v— between the traps and the juxtaposed part of the opposite blade to provide a venturi effect. The venturi effect is enhanced as at —v— when the smooth curve of the vane is complemented by the juxtaposed curve of the apex 17 with the blades presenting smooth wall surfaces to the fluid stream from the throats downstream to the next trap.

Supplementing the work of the traps 2 and placed generally downstream thereof we provide groups 3 and 4 of liquid removing means comprising small notches, teeth and serrations 23 which extend, like the traps 2, the entire vertical length of the blades. These small serrations facilitate the removal expecially of entrained fine liquid particles without inducing deleterious eddies or turbulence interiorly of the boundary layer of the fluid stream. Preferably, the means 23 are formed on intermediate sections 18 near the exit ends of the blades as is group 3. As shown in FIG. 2, the serrated means of group 4 is located on a side of each blade opposite the last, rightward as viewed, of the traps 2. The group 4 serrated means is not only opposite one of the traps 2 on the same blade but is also opposite, and a bit downstream, of the traps 2 of the juxtaposed adjacent blade.

It appears from our present tests and observations that the exterior convex faces of these "last" traps tend to deflect finely divided and entrained liquid particles with and from the fluid stream into the group 4 serrated means without harmful influence on the venturi effect nor deleterious drag on the fluid stream. In its further movement the stream tends to unload the last increment, if any, of its liquid content on the "far" wall of and beyond the last of the apexes 17 and into the group 3 serrated liquid diverting means. The serrations 23 are unavoidably shown in FIGS. 2, 4 and 5 at more than full size. In the forms which we have tested satisfactorily each serration comprises a sharp peak standing about 1/32 inch high from the surface of the blade with an upstream face normal to the blade's surface and the downstream face inclined back to the surface of the blade. These projections extend about 1/16 inch in the direction of movement of the stream along the blade's surface, and the peaks of the projections are spaced about 1/8 inch apart. What we call notches and serrations are literally the spaced small sharp peaks standing above the blade's surface and facing the liquid particles that are projected toward, or flow along the blade surface toward the serrations.

Each blade B has the same mounting means at its horizontal ends in all the forms of our invention illustrated herein. A preferred mounting means is shown entirely and only at the left of FIG. 2 and in FIG. 3. It compriss reentrantly turned ends of the blades forming U-shaped "hooks" each having one leg in extension of the short straight part of the blade beyond the half-bend 16 near the entrance and exit ends of the blades, at 24 and 26. Given blades of resiliently yielding material the hooks are readily snapped into and secured in the openings 25 of the holding brackets 15. The openings 25 have restricted throat entrances smaller than the span of the hooks to provide a snap fit.

We prefer to turn the ends of the blades to dispose the reentrant turns of the hooks 24 and 26 on the same side of each blade as shown in all FIGS. 2, 4, 5 and 6. The brackets 15 grip only very limited parts of the vertical lengths of the blade, so the hooked ends of the blades which lie vertically between brackets 15 tend to contribute to a venturi effect on, and acceleration of the fluid stream into, the upstream ends of the blades and into the adjacent 45° half-bends 16 thereof. In all forms the reentrantly turned part of each hook 24, taken with the nearby convex surface of the half-bend 16 of the same blade, on one side of the fluid stream, the upper, as viewed, coacts with the convex surface of the trap vane 22 on the juxtaposed blade, on the opposite side of the stream, to tend to project the entrained liquid, which escaped the first of the traps 2, into the concave apex 17 of the first full bend and into the second of the traps 2 downstreamwardly adjacent thereto.

The hooks 26 at the far; i.e., exit, ends of the blades, while appearing to contradict our experience and teaching with respect to the turbulence-free effects of the traps 2 on the fluid stream, do, in fact, contribute to that same advantage by virtue of their relation to the half-bends 16 at the exit, right as viewed, ends of the blades. There, the fluid streams pursuing the direction of the most rightwardly, as viewed, of the arrows 21, FIG. 2, tend to sweep past and avoid the open mouths 26a of the upstream-facing hooks 26 as suggested by the small curved arrows 6 on the "upper," as viewed, part of each stream. The opposite part of each stream flowing over the juxtaposed blade tends to continue its smooth, free laminar way until deflected by the concave side of the exit half-bends 16 to become dry, free-flowing exhaust from the eliminator as also suggested by the others of the curved arrows 6. The disposition of the bulk and body of both the oppositely facing hooks 24 and 26 adjacent the half-bends 16 and on the same side of the blade and fluid stream has contributed significantly to the reduced pressure drop across the eliminator without sacrifice of efficiency of liquid elimination or speed of flow of the fluid stream. The hooks 26 bestow one more blessing. Should the group 3 of serrations 23 overflow, the overflow liquid will tend to flow along the adjacent downstream surface of the blade into quiescence within the hooks whence gravity will take the liquid out of the eliminator.

The blades B in FIG. 4 are the same as those of FIG. 2, and the same reference characters are applied to like parts, with exception that the vanes 27a, b and c embracing traps 5a, b and c have specifically different forms and locations. Comparison with the vanes 22 and traps 2 of FIG. 2 will illumine the function and mode of operation of our invention and these specific forms thereof.

The vanes 27a are rooted in the blades somewhat farther downstream of the nodes 19 than are the vanes 22. The vanes are a little flatter and more streamlined to elongate the traps 5a and bring the vanes and the exposed ends thereof to closer proximity with the blades and at the slitlike, vertical mouths of the traps. These mouths, however, are moved a little downstream of the half-bends 16 and more nearly opposite the middle core of the entering stream and more advantageously positioned to entrap the deentrained liquid constituents promptly upon their initial entrance into the first half-bends of the blades. Moreover, the convex faces of the vanes 27a are more truly opposite the convex faces of the bends 16 of the juxtaposed "upper," as viewed, blade, and in more venturi-like relation therewith, whereby to tend to project the entrained liquid particles, not lost to traps 5a, into traps 5b.

The traps 5b are similarly disposed further downstream, relatively flattened and elongated with the vanes 27b rooted beyond nodes 19 and having their exposed upstream ends sharpened and placed closer to the blades to narrow the mouths of the traps and smooth the paths of the fluid streams beyond the apexes 17 of the first full bends. The convex faces of the vanes 27b are more nearly complementary to the convex curves of and following the full bends of the opposite juxtaposed blades in a more venturi-like disposition to promote the projection of entrained liquid into the traps 5c. Traps 5c, while rooted to the body of the blades in about the same relation to the nodes 19 as the corresponding traps 2 of FIG. 2, have, however, the other characteristics and advantages of traps 5a and b, and relate to the group 4 serrations in substantially the same way.

Our present test and experimental data suggest that the advantages of our invention may be realized more abundantly in the form, size, wave length, amplitude, etc. of FIG. 4 than in FIG. 2 in respect to removing water from air: a thing which does not necessarily mean that the FIG. 2 form is inferior for use with other fluids and mixtures, nor in all other sizes, configurations and circumstances of use.

Another modified form of our invention is illustrated in FIG. 5 wherein the apexes 30 of the first full bend of these blades B have been offset to "raise" the apexes and shift them downstream, cf. dotted lines 29, whereby to narrow and emphasize the venturi throat W in coaction with the convex surface of the modified vane 28b. Dotted lines 29 show the location of the apexes 17 as in the other forms and illustrate the relative extent and disposition of the offset in this form of our invention. It will be appreciated that the exact form, axial direction and location of the throat of the venturi to project the entrained liquid most efficiently in the direction of the arrows 21a for maximum entrapment in trap 5c will probably depend upon the velocity of the fluid stream upstream of the venturi and the core of the modified path 20a of the stream entering the venturi. Such factors are not obscure. Our teaching in this form is to get a more beneficient venturi-like coaction between the offset apex 30 and the vane 28b than we presently apprehend without the offset apex.

In this form we prefer to carry the upstream ends of the vanes 28b upstream of the downstream ends of the offset apexes 30 so that the mouths 31 of the traps 7b are inclined to open into the compound concave curved surface of the apex to trap the liquid flowing thereon and deflect the gaseous constituents moving in the path 20a into the throat W of the venturi more effectively.

In other respects this form of our invention may for illustration correspond to FIG. 4. Like parts thereof in FIG. 5 are identified by the same reference characters.

Figure 6:
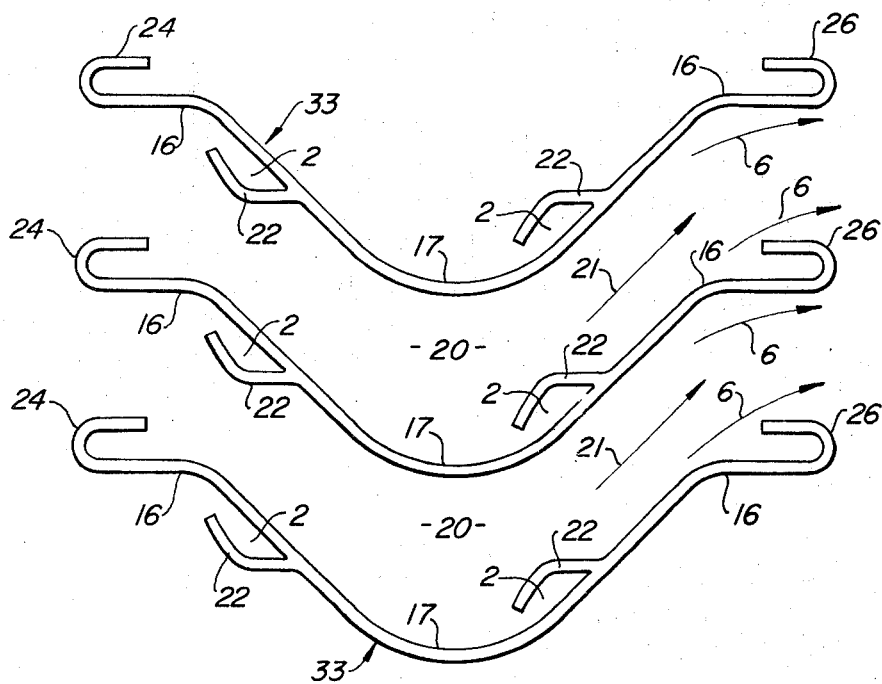
FIG. 6 is a top plan view, taken from the other end of the eliminator, otherwise similar to FIG. 2, of a half-length blade corresponding, in part, particularly to the left half of the blade of FIG. 2.

Another modified form of our invention is illustrated in FIG. 6 which is drawn upside down compared with FIGS. 2, 4 and 5 to show, however, that the identities persist in spite of the different point of view. The blades in this form are only half the length of the blades B and are given a distinguishing reference character 33 for this reason. Their employment and arrangement in an eliminator may be the same as the blades B in FIG. 1 and may be secured at their vertical ends in brackets 15 as illustrated and described in FIG. 2. Compared with the eliminator of FIG. 1, the blades 33 facilitate a more shallow body from inlet to outlet and encourage a greater area of inlet and outlet where that is advantageous and suitable.

The blades 33 are the same in part as the blades B of FIG. 2, and like reference characters designate like parts. The difference is that the downstream parts of the blades of FIG. 2 which embrace the groups 3 and 4 of the liquid diverting serration 23 and the last trap have been removed. More particularly, blades 33 of FIG. 6 comprise the left, as viewed, ends of blades B of FIG. 2 down to the center of the middle full bend 17 to which is added the right end of blades B from the middle of the half-bend 16 to and including the terminal hooks 26. As in FIG. 2 the hooks 24 and 26 lie on the same, upper as viewed, side of each blade and the fluid stream flowing in the path 20 behaves as described with reference to FIG. 2 with respect to the bends 17, traps 2 and vanes 22; the fluid stream approaching the downstream half-bends 16 of each path as suggested by the arrow 21, and sweeping out of the eliminator past the hooks 26 as suggested by the curved arrows 6 with the advantages described in relation to FIG. 2.

The materials from which blades embodying our invention are made preferably comprise those which may be shaped by extrusion such as aluminum, or thermoplastic resins and materials. The choice of materials will also comprehend cost as well as environmental accommodation as to temperature and the nature of the fluids to which the blades are exposed. Exemplary resins which may be used include polystyrene, polyvinyl chloride, polytetrafluorethylene, nylon, polyethylene, and the like. An especially preferred material for the blades is an acrylonitrile-butadiene-styrene terpolymer.

Another consideration about choosing a material is its wetability by the liquid in the presence of the gas from which the liquid is to be removed. It is our preference that the nature of the material and the texture of the surface of the blades be such as to encourage the moving adhesion of the liquid thereto and the build-up of a freely moving liquid film or film-like stream on the surfaces of the blades which lead to the traps and other liquid diverting means. Similarly materials having low surface drag on the gaseous constituents of the fluid stream contribute to the advantage of low pressure drop through the eliminator.

As mentioned above the blades as depicted in FIGS. 2, 4, 5 and 6 have been drawn on the bristol board drawings of this application at approximately full size for these particular forms and embodiments of our invention. These are forms which are present test and experimental data have shown to give satisfactory results and desirable advantages. In these forms the amplitude of the "sine" curves has been about 13/16 inch; the wave length about 5 inches and the overall horizontal length as shown in FIGS. 2, 4 and 5, about 10 ½ inches. In these forms, including FIG. 6, the blades have been spaced about 1 ¼ inches apart whereby the throat of the venturi —v— of FIG. 2 measures about 11/16 inch and the throat of the venturi W in FIG. 5 is narrowed to between about ½ inch and 9/16 inch. These blades were extruded of plastic material and the blades and vanes had an essential wall thickness of about 1/16 inch. The tapered ends of the vanes terminate in very small radius roundings or with such sharpness as may be practicable for commercial extrusion. The hooks 24 and 26 were conveniently made about ½ inch in the direction of the horizontal length of the blades and were given a span of about ⅜ inch so that the open mouths of the hooks such as 26a measure about ¼ inch.

Should the blades of the eliminator be inclined in the vertical plane of the general movement of fluid through the eliminator to place the top ends of the blades upstream relative to the bottom ends of the blades so that the traps, apexes, horizontal ends and all the upwardly and downwardly extending parts of the blades be inclined at about 10° from the vertical, the rate of liquid elimination is noticeably enhanced. For example with the vertical lengths of the blades standing vertically and the blades having the spacing amplitude, wave length and horizontal length mentioned above and shown in FIGS. 2, 4, 5 and 6, the liquid, water, elimination was observed to be substantially complete whilst the fluid velocity through the eliminator was increased to about 1,300 feet per minute. When, however, the blades were inclined said 10° from the vertical with the top ends of the blades moved upstream, fluid with the same initial water content was moved through the eliminator at about 1,800 feet per minute before any departure from substantially complete elimination of the water was observed. That is to say, the fluid stream could be moved 500 feet per minute faster with the inclined blades than with the truly vertical blades without carrying over any noticeable entrained liquid.

It has been found practicable to employ blades embodying our invention as great as 12 feet in vertical length in eliminators where a large volume of gaseous fluid with light to medium liquid content was removed. In installations where the liquid content of the gaseous fluid stream is high the vertical length of the blades, in each eliminator cabinet or container having the same number of blades and having its own drainage tray or system, is prudently reduced as for example from 12 feet down to 6 feet so that the traps will not be overloaded with liquid near the bottoms of the blades. In that event the number of such eliminators will be increased to accommodate the same gross flow of gas. Loading of air with more water content may prudently require that the vanes have still less vertical length, and the number of vanes be comparatively increased. The number of blades of the forms and sizes herein depicted that may be most advantageously employed in one eliminator cabinet, as suggested in FIG. 1, reduces itself to a matter of dollars and cents in respect to the cost of the cabinet in one form or another in relation, for example, to the shape and form of duct work employed to lead the liquid laden gas to the eliminators that are required to remove the desired amount or part of liquid content from the carrier gas.

We made comparative tests between an eliminator employing a group of blades embodying our invention in the form of FIG. 2, on the one hand, and a similar group of blades following in part the prior art, on the other hand. The partial prior art design had the same wave length and amplitude as our blade with traps in the same locations as in our blades, but all the so-called traps and water diverting devices comprised straight, short flat vanes extending about a quarter way into the paths of the fluid stream at acute angles to intermediate parts of the blades and in the same plane as the nodes of the curve of the blades. These blades incorporated mere symmetrical enlargements of the horizontal ends of the blades for attachment to brackets similar to the brackets 15 hereof. These quasi prior art blades had no end configurations like our hooks 24 and 26. Illustrative results of this comparison were that when the fluid pressure drop across the eliminator was .04 inch of water in both instances, the flow through the eliminator having the prior art type blades was only about 340 feet per minute. Whereas the blades embodying our invention yielded a flow of about 600 feet per minute: an increase of about 75 percent in rate of fluid flow. At higher velocities obtained by a pressure drop of .40 inch of water across the eliminator, the prior art type blade permitted a velocity of about 1,050 feet per minute whereas the blade embodying our invention permitted a velocity of almost 2,000 feet per minute: an increase of about 90 percent in the rate of fluid flow.

While we have illustrated and described specifically preferred forms of our invention, modifications and improvements will occur to those skilled in the art who come to understand and enjoy the essential principles thereof and of the teachings of this specification. Therefore we do not want to be limited in the scope and effect of our patent to the forms of our invention herein specifically disclosed nor in any other manner inconsistent with the progress by which our invention has promoted the art.

We claim:

1. In an eliminator for removing moisture from a gas stream, the combination of a pair of sinuous continuour moisture eliminator blades, each blade having bends with alternate convex and concave apexes, and means supporting said blades in spaced complementary parallelism and defining therewith an open sinuous path for said stream from an inlet at one end of the blades to an outlet at the other end of the blades, a first blade on one side of said path having a convex apex opposite a concave apex of a second blade on the other side of said path, a crescent-shaped vane joined to said second blade downstream of said concave apex and defining with said second blade a liquid trap opening toward said concave apex, the opening of said trap being located between said concave apex and an adjacent convex apex of said second blade and at no greater distance from said concave apex than midway between said concave and convex apexes, said vane having a crescent-shaped convex surface facing a portion of said convex apex on said first blade and defining therewith a venturi-like restriction in said path.

2. The combination of claim 1 in which the extreme upstream end of said vane is tapered and sharpened to penetrate the moving gaseous stream and narrow the opening to said trap.

3. The combination of claim 1 in which said vane is of flattened crescent-shape and is elongated with its extreme upstream end overlying the downstream end of the bed having the concave apex.

4. A moisture eliminator blade adapted to be used with like blades to provide paths for gaseous streams including entrained liquid to be eliminated, said blade having upstream and downstream ends and a continuous sinuous configuration with a generally medial curved bend having an apex and connecting upstream and downstream intermediate sections, a crescent-shaped vane having its downstream end joined to said blade on the concave side of said bend downstream of said apex when said blade is located in a gaseous stream, said vane having a crescent-shaped surface extending outwardly from said blade and then curving toward but terminating short of contact with said blade and defining with said blade a liquid trap opening toward said apex, said opening of said trap being located on said downstream intermediate section at no greater distance from said apex than midway of said downstream intermediate section and adapted to receive liquid thrown from the gaseous stream flowing on said bend, the crescent-shape of the surface of said vane near said opening diverting said gas stream away from said opening and past said vane.

5. The blade of claim 4 with a reentrant U-shaped part at its downstream end, said blade also having a second bend with a convex surface adjacent said part and located between said part and said downstream intermediate section, said U-shaped part lying on the same side of the blade as said vane, said U-shaped part opening toward the direction of flow of the gaseous stream, the convex surface of said second bend diverting the gaseous stream away from the opening of said U-shaped part.

6. The combination of claim 1 with a vane joined to said first blade at a position corresponding to that on said second blade and with finely serrated liquid diverting means on the surface of each blade opposite to that supporting said vane and between said apexes.

7. In an eliminator for removing entrained liquid from a moving gaseous stream, the combination of a pair of sinuous continuous moisture eliminator blades and means supporting said blades in spaced complementary parallelism and defining therewith an open sinuous path for said stream from an inlet at one end of said blades to an outlet at the other end of said blades, each blade having alternate oppositely curved bends and intermediate sections joining said bends, at least one of said bends on each blade comprising an apex, a first blade on one side of said path having a convex apex opposite a concave apex of a second blade on the other side of said path, a crescent-shaped vane joined to said second blade at an acute angle thereto downstream of said concave apex and defining with said second blade a liquid trap openinng toward said concave apex, said opening of said trap being located on the intermediate section immediately downstream of said concave apex at no greater distance from said concave apex than midway of said intermediate section, said vane having a crescent-shaped convex surface facing a portion of said convex apex and defining therewith a venturi-like restriction in said path.

8. The combination of claim 7 wherein said first blade has a concave apex downstream of said venturi-like restriction into which entrained liquid is projected, and means for removing said projected liquid from said apex.

9. The combination of claim 7 wherein the width of the throat of said venturi-like restriction between said convex apex and said vane is approximately one-half the width of said path adjacent thereto.

10. The combination of claim 7 wherein each blade has mounting means at its upstream and downstream ends which comprise U-shaped parts lying on the same side of each blade with the openings of both U-shaped parts facing each other, each blade having half-bends near said ends and straight sections comprising one leg of each U-shaped part joining said half-bends and said parts, the opening of the part in said downstream end being shielded from the stream of fluid leaving said path by the half-bend upstream thereof.

11. The combination of claim 7 wherein said first blade provides finely serrated liquid diverting means in said path downstream of said venturi-like restriction.

12. The combination of claim 11 wherein said blades are longer in the direction of said path than a half cycle of the curve of said blades and said serrated liquid diverting means is located on said first blade downstream of the half cycle point of said curve.

13. The combination of claim 12 wherein each of said blades has one of said vanes on one side of the blade and one of said serrated liquid diverting means on the opposite side thereof.

14. A moisture eliminator blade adapted to be used with like blades to provide paths for gaseous streams including entrained liquid to be eliminated, said blade having a continuous sinuous configuration with alternate oppositely curved bends and intermediate sections joining said bends, at least one of said bends comprising an apex, a crescent-shaped vane joined to said blade on the concave side of said apex and downstream of said apex, said vane having a crescent-shaped surface extending outwardly from said blade at an acute angle thereto and then curving toward said blade and defining with said blade a liquid trap opening toward said apex, said opening of said trap being located on the intermediate section immediately downstream of said apex at no greater distance from said apex than midway of said downstream intermediate section.

15. A blade according to clalm 14 including a plurality of serrations formed in the surface of said blade having the convex side of said apex, said serrations being spaced from said apex in the same direction therefrom as said vane.

16. A blade according to claim 14 adapted to be used with like blades to define sinuous paths for fluid including entrained liquid to be eliminated, said blade having a bend near one end thereof and having mounting means located at said one end on the same side of said blade as the convex surface of said bend.

17. A blade according to claim 16 with the end thereof opposite said one end having a bend and a like mounting means located on the same side of said blade as said first mounting means.

18. A blade according to claim 16 wherein said mounting means comprises a U-shaped hook opening toward said convex surface of said bend.

19. A blade according to claim 16 wherein the surface of said blade from the concave surface of said bend to said one end is smooth and free of obstruction.

20. A blade according to claim 17 wherein said mounting means each comprises a U-shaped hook opening toward the convex surface of said bends.

* * * * *